United States Patent [19]

Daamen et al.

[11] Patent Number: 4,838,972
[45] Date of Patent: Jun. 13, 1989

[54] PROCESS FOR THE MANUFACTURE OF BUNDLES OF SEMI-PERMEABLE HOLLOW FILAMENTS FOR USE IN BLOOD, PLASMA AND DIALYSATE FILTERS

[75] Inventors: Jacobus J. H. G. Daamen, Bladel; Peter J. De Haan, Veldhoven; Evert J. Klip, Hilvarenbeek, all of Netherlands

[73] Assignee: Organon Teknika B.V., Netherlands

[21] Appl. No.: 91,999

[22] Filed: Sep. 2, 1987

[30] Foreign Application Priority Data

Sep. 25, 1986 [NL] Netherlands ............... 8602416

[51] Int. Cl.⁴ .................................... B31C 13/00
[52] U.S. Cl. .................................... 156/175; 156/213; 156/250; 156/296; 242/53
[58] Field of Search .............. 156/174, 296, 201, 203, 156/294, 54, 55, 175, 250, 213; 242/7.02, 7.21, 186, 53, 127

[56] References Cited

U.S. PATENT DOCUMENTS

| | | | |
|---|---|---|---|
| 3,215,029 | 11/1965 | Woodcock | 156/174 |
| 3,442,002 | 5/1969 | Geary, Jr. et al. | 29/450 |
| 3,499,807 | 3/1970 | Hurtes | 156/72 |
| 3,514,351 | 5/1970 | Mukai | 156/175 |
| 3,689,982 | 9/1972 | Campbell | 29/430 |
| 3,772,119 | 11/1973 | Peck | 156/174 |
| 3,777,632 | 12/1973 | Pepmeier | 156/203 |
| 3,951,022 | 4/1976 | Hurtes | 83/152 |
| 4,211,597 | 7/1980 | Lipps et al. | 156/245 |
| 4,276,687 | 7/1981 | Schnell | 242/186 |
| 4,341,005 | 7/1982 | Oscarsson | 242/186 |
| 4,343,668 | 8/1982 | Francisoud et al. | 156/175 |
| 4,360,395 | 11/1982 | Suzuki | 156/201 |

Primary Examiner—Michael W. Ball
Assistant Examiner—David W. Herb
Attorney, Agent, or Firm—Oliff & Berridge

[57] ABSTRACT

Manufacture of bundles of at least 1000 semi-permeable hollow fibres for use in filters such as, e.g., blood, plasma and dialysate filters, and in artificial kidneys. One or more hollow filaments are wound onto a reel until the formed package contains the number of filaments required for bundle formation. After which the package is cut into fibre bundles of the desired length. The package is held in one place of the reel and a free end is introduced into a sleeve having a length which is a number of times that of the length of the fibre bundle in the final filter. The sleeve is cut into fibre bundles of the desired length.

13 Claims, 6 Drawing Sheets fig.1 fig.2 fig.7

Section VII-VII fig.8

Section VIII-VIII fig. 9

PROCESS FOR THE MANUFACTURE OF BUNDLES OF SEMI-PERMEABLE HOLLOW FILAMENTS FOR USE IN BLOOD, PLASMA AND DIALYSATE FILTERS

DESCRIPTION OF THE TECHNICAL FIELD

The invention relates to a process for the manufacture of filament bundles each comprising at least 1000 semi-permeable hollow filaments for use in filters, such as blood and plasma filters and dialysate filters, more particularly artificial kidneys, in which process hollow filaments fed from one or more bobbins or directly from the spinning process wound onto a reel to form a skein comprising the number of filaments required for the filter bundle, which skein is cut into bundles of a particularly desired length.

Such a process is known from, e.g., U.S. Pat. No. 3,691,068. Although in principle good results may be obtained with it, it is not entirely without any problems. First of all, it is relatively difficult to form several filter bundles from a skein comprising at least 1000 hollow filaments. To that end first the skein of 1000 or more very thin hollow filaments is removed from the reel, care being taken that the filaments of the skein are kept together. The next step consists in trying to cut the skein into portions having the length of the filter filament bundle required for the artificial kidney. There is the great risk then that not all of the hollow filaments are cut to exactly the same length or that the bundle will lose its coherence and disintegrate into a great many separate hollow filaments, which must then be re-bundled, which is a time consuming and uneconomical operation. In the known process there is consequently a great chance that a number of the very thin hollow filaments will be kinked and/or so damaged that they will become leaky. Particularly in the case where the filter filament bundles are used in artificial kidneys the presence of damaged or leaky filaments is absolutely unacceptable. A further complication is that in a filter bundle the filaments that are not leaky yet, but slightly damaged can practically not be detected beforehand. In that case it may happen that damaged filaments will not leak until the artificial kidney is connected to a patient, so that the kidney dialysis process must be interrupted, which is particularly objectionable.

In said known process a skein of hollow filaments is wound on a reel having a square cross-section. Owing to the great difference in radius of curvature between the parts of the hollow filaments at the corners and on the flat parts of the square reel there will also be differences in properties and tensions between the strongly curving and the straight pieces. The curved pieces of the skein formed on said reel can therefore not be used in the filter filament bundle. Consequently the curved pieces must be removed from such a skein which in addition to the extra work it involves causes large amounts of material to go to waste, particularly considering that yearly millions of filter filament bundles are made for artificial kidneys. Another disadvantage to the strong curvature of the skein at the angular points is that there is a great difference in length between the hollow inner filaments and the hollow outer filaments, which also is inadmissible in a filter filament bundle for an artificial kidney.

It should be added that in order to remove the difference in length due to the difference in radius of curvature between the inner bend and the outer bend of of the skein it has been proposed in DE No. 2 944 172 that the filaments be wound on a circular reel and the filter filament bundles be placed in a dialyser housing which is curved in longitudinal direction and has the same radius of curvature as the reel. Although in itself a good solution to the problem of differences in length due to differences in radius of curvature, it may in actual practice not be quite desirable for the housing to be curved because of its being connected to other parts of the dialyser. Further, such a curved dialyser housing is difficult to manufacture and incorporate in the production of artificial kidneys. Reference is also made to DE No. 1 544 107, which discloses a dialyser made up of groups of filaments, each of which groups is surrounded by a flexible, porous sleeve. To obtain a uniform packing density of the semi-permeable, hollow filaments in the group bundles and in the filter or dialyser housing each sleeve permits being constrained transverse to the longitudinal direction of the bundles. The sleeves may be made of a circular knitting, a woven fabric, a braid, a netting, or the like of cotton or some other material. FIG. 10-14 in DE No. 1 544 107, for instance, show that a group of filaments is formed by removing one complete skein from the reel and folding it double to a length corresponding to the length of the filter or dialyser housing. Subsequently, a constrainable sleeve is placed on each of the folder groups of filaments. Then a number of sleeved filament groups are placed in a filter or dialyser housing and cut to desired length. A disadvantage to the known method is that part of the internal volume of the filter or dialyser housing is not operative as filtration volume because it is taken up by the sleeves of the groups of filaments. Another disvantage is that in the filter housing the flushing or purifying liquid will find its way around and between the outsides of the filament groups separated by the sleeves, which will result in undesirable and unfavourable flow and channel formation between the filament groups. Consequently, there will only be a purfication of blood or other liquid present in the outer rows of the hollow filaments in the filament groups, so that the artificial kidney does not work quite satisfactorily. Another disadvantage to the process according to DE No. 1 544 107 is that after the filament bundles are placed in the filter or dialyser housing they are severed collectively. There is the risk then that severing the filament bundles will result in the hollow filaments being damaged or in differences in length between the hollow filaments at the outer circumference of the filament groups and the hollow inner filaments thereof.

CH No. 435 693 describes a process for making blocks or plates from a number of parts that are pressed together at a certain temperature and pressure. The parts are cut from a skein of spun thermoplastic hollow filaments. The reel on which the filaments are wound into a skein may have a diameter of 10 m and the skein may have a thickness of 15% thereof, i.e. 150 cm. On the reel the skein is cut into parts. In a later stage a number of parts are pressed together under the influence of heat and pressure to form larger blocks or plates. The object of the process according to CH No. 435 693 is to provide a block or plate which consists of hollow filaments and forms a light and strong construction material similar to foam material. The reel may have a round, oval or square circumference, onto which the hollow filaments may be directly wound from an extruder.

U.S. Pat. No. 3,689,982 shows that it is known in itself for a cable, more particularly a steel cable applicable in pre-stressed concrete, to be covered with some kind of tubular sleeve.

Japanese Patent Publication No. 57-184 065 describes the process of winding a large number of filaments onto a polygonal reel. On each cord a separate sleeve is provided. After a long bundle has been removed from reel and straightened, adhesive tapes are provided between the successive sleeves. Subsequently the long bundle is collectively severed at the tapes. This method may cause the filament bundle to be fouled by glue rests of the adhesive tape and give rise to more yarn or filament waste. Moreover, it will be difficult to obtain a satisfactory bundle structure. Furthermore, this well-known method is difficult to mechanize.

DE-OS-No. 2 824 898 describes a process for the manufacture of artificial kidneys (see FIG. 14), in which process a bundle of endless filaments is passed through some device in which at desired intervals a casting mass is applied to the bundle to form tube plates. A disadvantage to this known method is that embedment of the hollow filaments in the casting mass cannot be satisfactorily controlled and the casting mass may not properly penetrate between the hollow filaments. Moreover, the process is relatively slow because of the intermittent hardening of the casting mass. Furthermore, it requires the use of quite a few bobbins or spinning positions in order to form one bundle of hollow filaments. Besides, the bundle is difficult to handle because of the lack of protection of the bundle, as a result of which there will be a greater chance of leakage.

SUMMARY OF THE INVENTION

The invention has for its object to provide a process of the type indicated in the opening paragraph which no longer displays said drawbacks. The process is characterized according to the invention in that the skein is retained on the reel in at least one place and that preferably close to the point at which the skein is attached it is severed on the reel, so that a free skein end is obtained, and that the free skein end is inserted into a sleeve or sheath having a length which is several times, preferably at least three times, the length of the hollow filament bundle in the completed filter, and that the sleeve filled with hollow filaments, preferably while in the stretched rectilinear state, is cut into portions having the length of the hollow filament bundle in the filter. According to a preferred embodiment according to the invention the free skein end is introduced into a sleeve or sheath of which the length is ten fifty times, more particularly about twenty times, the length of the hollow filament bundle in the filter. Favourable results are obtained with a process which is characterized according to the invention in that said free skein end is provided with a pulling organ or pulling lump, by means of which the free skein end is pulled into the sleeve with the aid of a hook and an inlet funnel, which sleeve according to the invention has a length which is preferably equal to the circumference of the winding surface of the reel. The process according to the invention is also characterized in that the winding operation on the reel is so carried out that the completed skein of semi-permeable hollow filaments on the reel has a height H in radial direction which is for instance 50% smaller than the smallest average diameter of the filter filament bundle in the completed filter, measured transverse to the longitudinal direction of the filter bundle, the height H being preferably 5 to 45% of said diameter of the filter bundle in the completed filter. According to the invention this may be realized in a simple manner if after the filament skein has left the reel and before it is introduced into the sleeve its for instance flattened cross-sectional shape, is transformed, for instance via an adapter into the preferably circular, cross-section of the filter filament bundle in the filter or dialysis housing. A preferred embodiment of the process according to the invention is characterized in that use is made of a reel having a winding diameter of at least 50 cm, preferably 100-300 cm, and of which reel the winding surface viewed transverse to the axis of rotation has a circular cross-section and that the sleeve filled with hollow filaments is severed while in the stretched rectilinear state, for instance by means of rotating cutters, into portions having the length of the desired filter filament bundle. According to the invention the sleeve is removed from each of the filament bundles cut to the correct length, preferably after the filter filament bundle has been placed in the filter housing. According to the invention favourable results may be obtained if use is made of semi-permeable hollow filaments having an outer diameter of 100 to 1000 $\mu$m, preferably 150-250 $\mu$m, and a wall thickness of 2 to 100 $\mu$m, preferably 5-30 $\mu$m, and if use is made of semi-permeable hollow filaments selected from the group of materials comprising cellulose, such as cuprophane, cellulose acetate and diethylaminoethyl cellulose, which may or may not be partly saponified, and synthetic materials such as polysulphone, polypropylene, polycarbonate, ethylene vinyl alcohol, polyurethane, polyacrylonitrile, polymethylmethacrylate, polyamide and/or copolymers of said materials. The most favourable results are expected to be obtained if according to the invention use is made of filament bundles which are each composed of 2000 to 20 000, preferably about 4 500 to 10 000, semi-permeable hollow filaments.

According to the invention two or more, for instance: 5-10, separate skeins of semi-permeable hollow filaments may be formed on the reel simultaneously and at spaced intervals in axial direction of the reel and each separate skein is accordingly inserted into its own sleeve.

It has been found that the process according to the invention permits a particularly meticulous and accurate manufacture of filter filament bundles from semi-permeable hollow filaments free of kinks or any other damage, and it practically prevents the occurrence of leaky filaments.

Surprisingly, it has even been found that said transformation of the more or less flattened cross-section of the filament mass in the skein into the circular cross-section of the filament bundle in the sleeve and in the filter or dialyser housing can be effected without any problems, even when use is made of a very large number of very thin hollow filaments. As a result, particularly the differences in length between the inner and the outer hollow filaments in the skein are reduced to a minimum. Kinks and possibly resulting leaks in the hollow filaments can therefore be prevented according to the invention even if use is made of filaments of material such as cuproammonium, which are hardly resistant to kink loading (axial pressure load) and which moreover may stick together due to the gluing effect of the contingent use of some filling liquid.

Owing to the special way according to the invention of winding and encasing the hollow filaments it surprisingly appears that the filament bundle or skein is sheathed relatively loosely and reproducibly, which is beneficial to the quality of the bundle. The process according to the invention particularly results in a homogeneous distribution of the hollow filaments across the cross-section of the completed filter bundle, which contributes considerably to optimum flushing of the dialysate during dialysis. The sleeve to be used according to the invention may consist of a permanently tubular synthetic film material or of a film formed in situ into a tube which is heat-sealed. The sleeve also protects the vulnerable hollow filaments during the various process steps up to and including the insertion of the bundle into the filter or dialyser housing.

Another great advantage of the process of winding and encasing according to the invention is that it can be mechanized in a relatively simple way at only low capital expenditure.

When according the invention a plurality of adjacent skeins are wound onto the reel, the winding operation can generally be continued until there are no longer any filaments on the supply bobbins. Moreover, the process according to the invention leads to a considerable reduction of the amount of waste of costly hollow filaments, particularly as compared with the situation in which use is made of reels having a polygonal cross-section. The use of a circular reeel according to the invention will cause fewer fluctuations in the tension of the hollow filaments than a reel having a polygonal cross-section. Another advantage of the filter filament bundle formed according to the invention consists in that natural or subsequently introduced waves in the hollow filaments can be better maintained as a result of the lower filament tension during winding and the above-described way of encasing the filaments in the sleeve.

The invention particularly comprises an artificial kidney for treating human blood, which artificial kidney is provided with a special filter filament bundle made by the process according to the invention and accommodated in a filter housing provided with inlet and outlet connections.

BRIEF DESCRIPTION OF THE DRAWINGS

The invention will be further described with reference to the accompanying schematic drawing.

DETAILED DESCRIPTION OF THE PREFERRED EMBODIMENT

Figure 1:
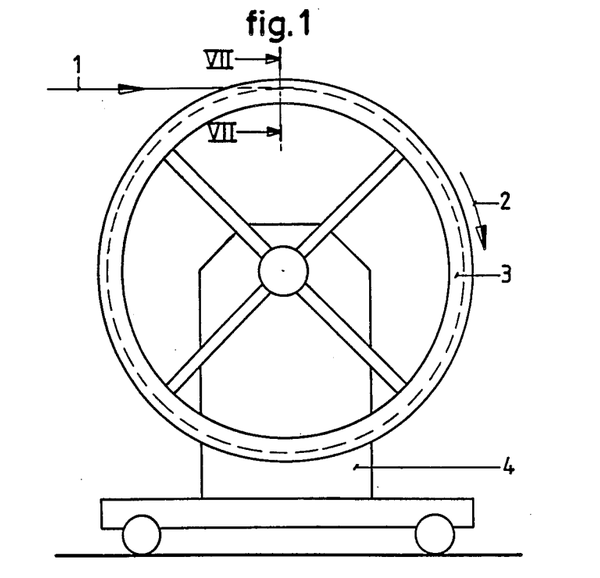
FIGS. 1 to 6 are illustrative of the various process steps in the manufacture of a number of filter filament bundles.
Figure 2:
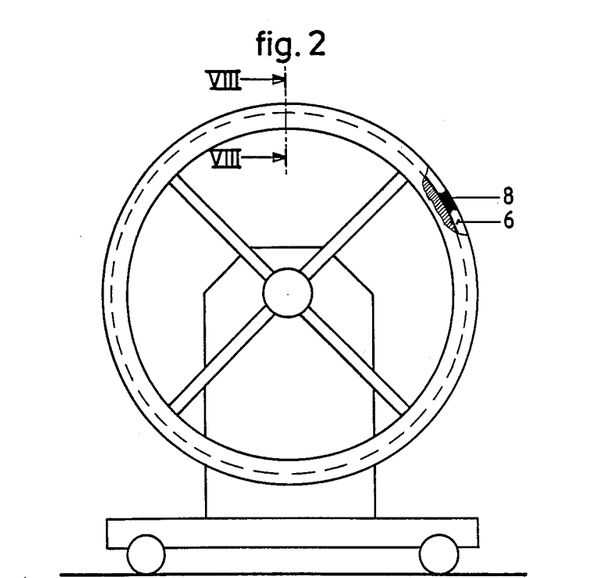
Figure 7:
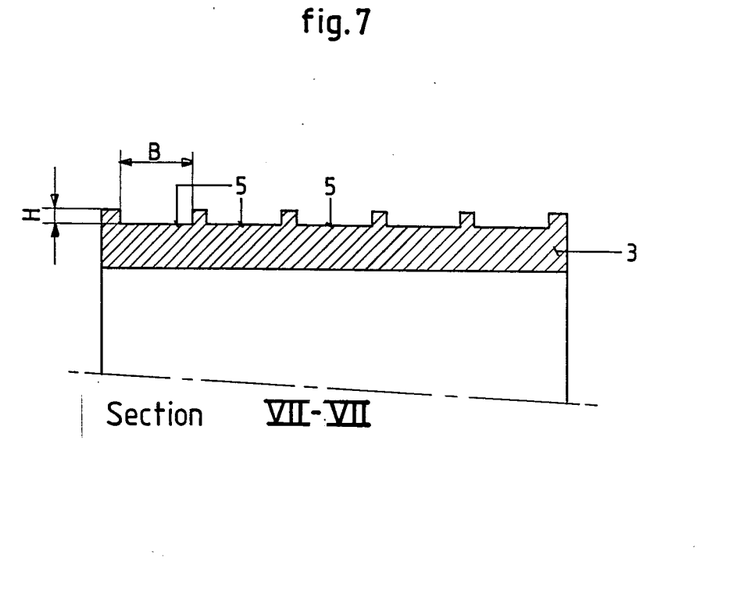
FIGS. 7 and 8 are sectional views of the reel along the lines VII—VII and VIII—VIII of FIG. 1 and FIG. 2, respectively.
Figure 8:
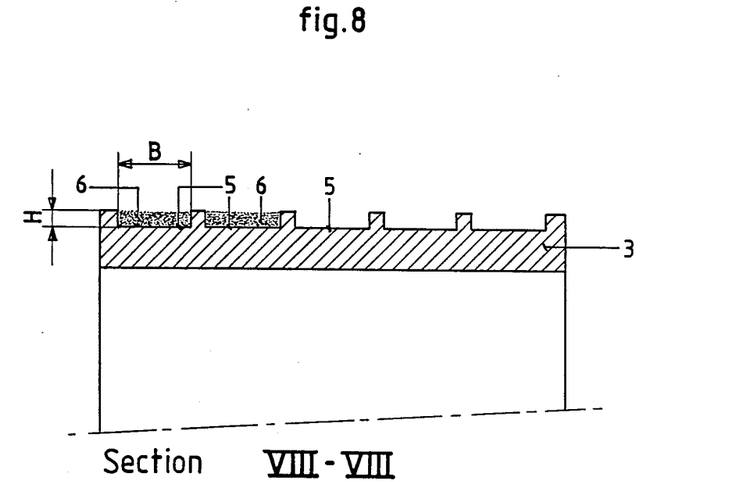

In FIG. 1 one or more hollow semi-permeable filaments 1 from supply bobbins or from a spinning machine (neither of which are shown in the drawing) are wound onto a driven, circular reel 3 rotating in the direction indicated by the arrow 2. The reel 3 is mounted in a frame 4 movable on wheels or in some other way and, viewed in axial direction, provided with five adjacent channels 5 having a radial height H and a width B (see FIGS. 7 and 8). In FIG. 7 all the channels 5 are shown in the empty state. In FIG. 8 all the channels 5 are drawn in the fully wound state, each channel 5 containing a skein 6 which is composed of the desired number of, say, 6000, hollow semi-permeable filaments 1 for a particular type of filter 7 (see FIG. 9) to be used in an artificial kidney. As soon as in each channel 5 the desired number of 6 000 hollow filaments is present, the reel 3 is stopped rotating. FIG. 2 again shows the fully wound reel 3, each coil now being fixed in one place on the circumferential surface of the reel 3 by means of a fastening mass 8 of some curable, synthetic resin. Instead of being formed in the channels shown in FIGS. 7 and 8 the coils may be wound contiguous to each other on a flat circumferential surface.

Figure 3:
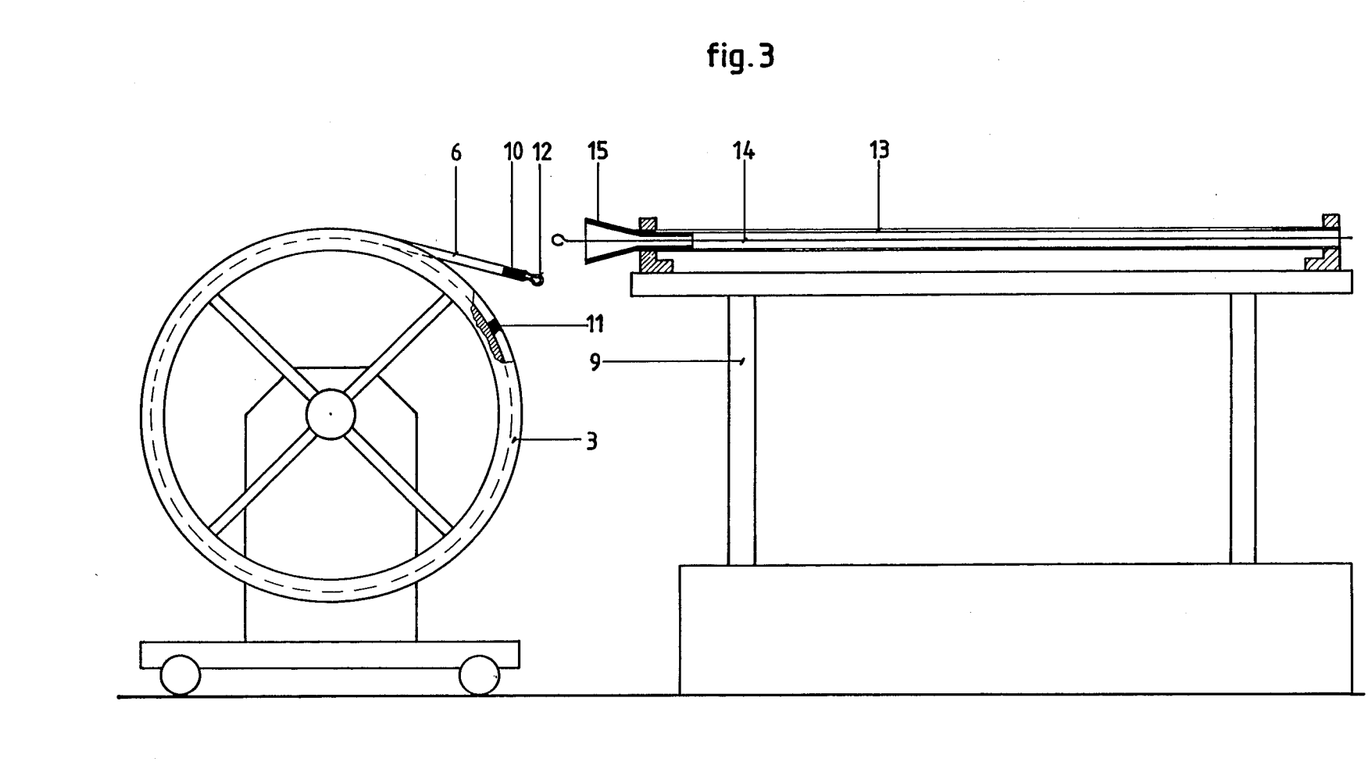
Figure 4:
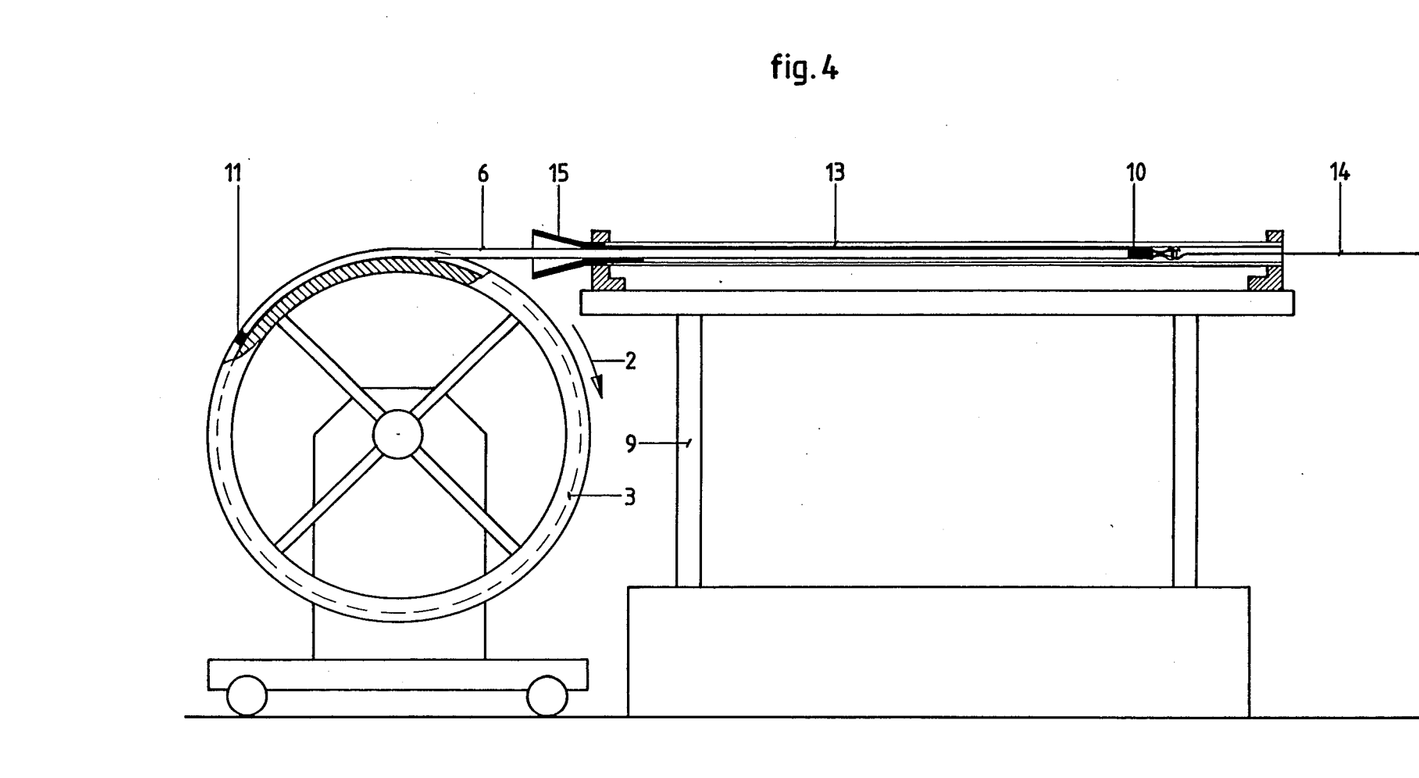
Figure 5:
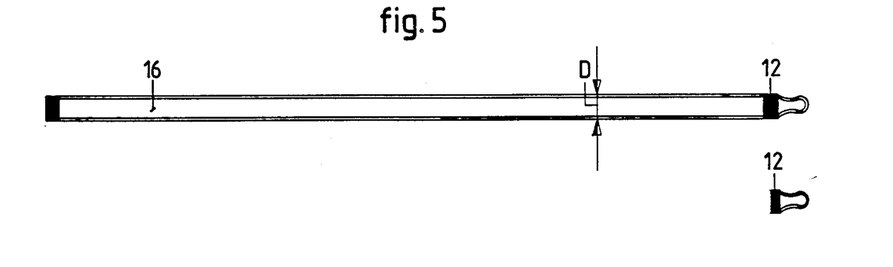
Figure 6:
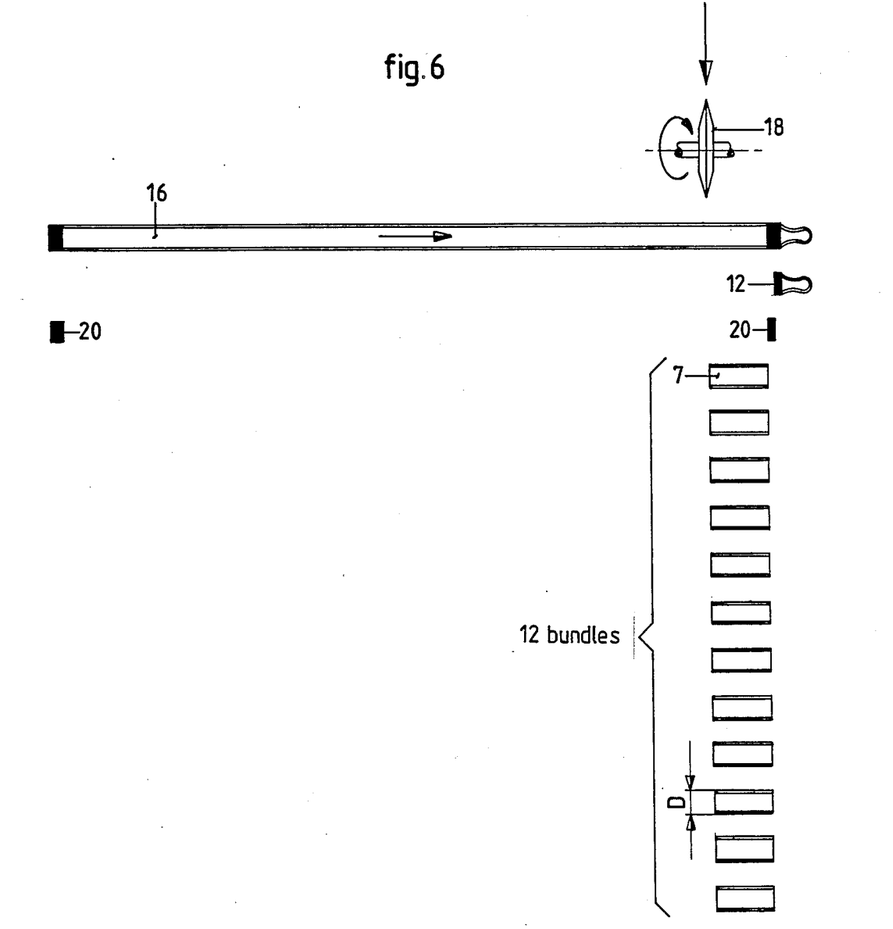

In FIG. 3 the reel 3 is moved to a position in front of a receiving table 9. In the position shown in FIG. 3 all the filament skeins 6 are so severed at the fastening mass 8 that one free skein end 10 is formed and one fixed skein end 11 which remains attached to the reel 3. The skein end 10 is then provided with an eye-containing lump 12. On the receiving table 9 there is for each skein a stretched or rolled up tubular film 13 which is to form the sleeve for the skein and in which there is an axially movable hook 14. At its entrance the sleeve 13 ends in a funnel 15 having a changing cross-section. The sleeve 13 has a length which is equal to the entire circumference of the circular reel 3. In the position shown in FIG. 3 the eye in the lump 12 is connected to the hook 14. With the aid of some driving device (not shown) the hook 14 is pulled in axial direction through the sleeve 13, the free end 10 of the skein 6 being pulled through the sleeve 13 and the remaining part of the skein is wound off from the reel 3. Shortly before the end of each unwinding operation the fixed end 11 of each skein 6 must be detached from the reel, after which the entire skein 6 is pulled into the sleeve 13. Upon being pulled through (as indicated in FIG. 4) the hollow filament bundles 16 each encased in a sleeve 13 (see FIG. 5) can be removed from the receiving table 9, after which the pulling lump 12 is removed. Subsequently, the five encased filament bundles 16 are placed in a cutting machine, as schematically indicated in FIG. 6. Use being made of a blade 18 mounted on a rotating shaft, the encased filament bundles are cut into twelve filter filament bundles 7, of which the length is equal to the length required for use in the filter unit (see FIG. 9). In FIG. 6 the twelve filter filament bundles 7 obtained from one encased filament bundle 16 are shown separately and in the same figure the small lumps of waste 20 formed upon cutting are indicated.

Figure 9:
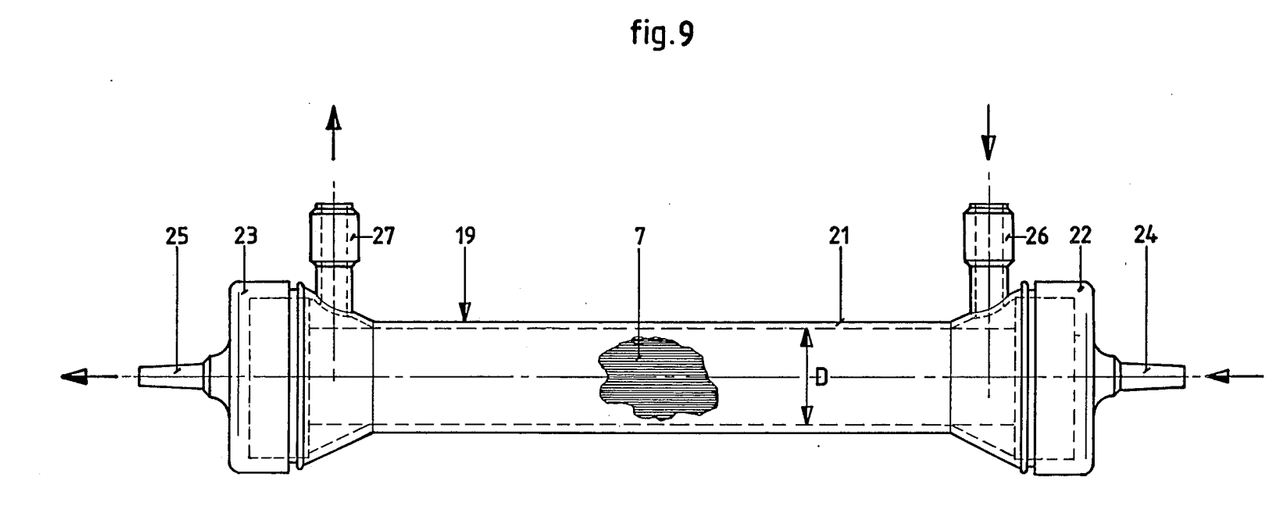
FIG. 9 is a view in side elevation of a filter unit with filter or dialysis housing for an artificial kidney.

For use in a particular type of filter unit 19 forming part of an artificial kidney each of the filter filament bundles has a diameter of 30 mm and a length of, say, 30 cm and consists of 6000 semi-permeable hollow filaments. The circumference of the reel 3 has therefore a corresponding length of 12×30 cm increased by the small length of the two waste lumps 20.

Each of the filter filament bundles 7 cut to the required length can now be placed in a housing 21 of a filter unit 19, after which the sleeve is removed from the filter filament bundle. After the hollow filaments have been embedded in a casting mass and after formation into pipe plate in a known manner, the filter unit 19 is provided at both ends with lids 22 and 23, which are fitted with inlet and outlet connections 24 and 25, respectively, for the liquid to be purified, i.e. blood in the case of an artificial kidney. The flushing or dialysis liquid can be supplied and discharged through the connecting pieces 26 and 27, respectively.

As mentioned previously, the process according to the invention makes it possible considerably to reduce the differences in length between the hollow filaments.

This is realized according to the invention in that the skeins 6 are wound onto the reel 3 in channels 5 having a radial height H which is less than 50% of the diameter D of the circular cross-section of the completed filter filament bundles. For instance H=O, 2D. The width B of the channels 5 and the skeins 6 must be such then that H×B is practically equal to the total surface area ($\pi/4$) $D^2$ of the completed filter bundle 7 in the filter unit 19. Then the internal cross-section of the funnel 15 must gradually change from rectangular to circular.

For the construction described hereinbefore, particularly with reference to FIGS. 3 and 4, the sleeve 13 is of ready-made tubular film. In a different embodiment according to the invention the sleeve is made from a roll of flat film which while being given some lap is transformed at the funnel into a tubular sleeve by means of a folding shoulder. The resulting tube emerging from the folding shoulder is heat-sealed at the overlap with the aid of a heat-seal bar. The tubular sleeve thus formed in situ containing the filament bundle 6 is transported in axial direction with the aid of two driven endless belts. The sealed tubular film or sleeve running in synchronism with the filament bundle contained in it has the advantage that there is no longer any movement of the sleeve relative to the filament. This also contributes to avoiding kinking of or damage to the hollow filaments. The encasement in situ of the filament in the tubular film or sleeve offers the additional advantage that the sleeve can be pulled on the filament bundles sufficiently tightly with accurate force. The sleeve protects the bundle of hollow filaments during the following process steps up to and including the insertion of the filament bundle into the filter housing. Within the scope of the inventions various modifications may be made.

We claim:

1. A process for the manufacture of filament bundles, each comprising at least 1000 semi-permeable hollow filaments for use in a filter, comprising winding one or more hollow filaments onto a reel to form a skein comprising the total number of filaments required for a filter bundle, fixing said skein on said reel in at least one place by fastening means, severing said skein, thereby producing a free skein end and a fixed end, inserting said free skein end into an overall sleeve while said fixed end is fixed on said reel, said sleeve and said skein disposed therein having a length at least three times that length of the hollow filament bundle in the filter, and cutting said sleeve and the filaments disposed therein while in a rectilinear state into at least three portions each portion having the length of the hollow filament bundle in the filter.

2. A process according to claim 1, characterized in that the free skein end together with said adjacent skein portion are encased in a sleeve whose length is ten to fifty times the length of the hollow filament bundle in the filter.

3. A process according to claim 1, characterized in that said free skein end is provided with a pulling organ, by means of which the free skein end is pulled into the sleeve with the aid of a hook and an inlet funnel.

4. A process according to claim 1, characterized in that the free skein end together with the remaining skein portion are encased in a sleeve of which the length is practically equal to the circumference of the winding surface of the reel.

5. A process according to claim 1, characterized in that on the reel the completed skein of hollow filaments has a height H in radial direction which is at least 50% smaller, than the smallest average diameter of the filter filament bundle in the filter, measured transverse to the longitudinal direction of the filter bundle.

6. A process according to claim 5, characterized in that the height H is from 5 to 45% of said diameter of the filter filament bundle in the complete filter.

7. A process according to claim 5, characterized in that after the skein has left the reel and before it is encased in the sleeve a substantially flattened cross-sectional shape of said skein is transformed into a substantially circular cross-sectional shape of the filter filament bundle in the filter.

8. A process according to claim 1, characterized in that use is made of a reel of which the winding surface viewed transverse to the axis of rotation has a circular cross-section.

9. A process according to claim 1, characterized in that at least two separate skeins of hollow filaments may be formed on the reel simultaneously, with each skein encased in its own sleeve.

10. A process according to claim 1, characterized in that use is made of a reel of which the diameter of the winding surface is at least 50 cm.

11. A process according to claim 1, characterized in that the skein is introduced into the sleeve simultaneously with formation of the same from a film, which may be flat, for instance, and which while under a low tension is folded around the skein and bonded or sealed at the overlapping longitudinal seams.

12. A process according to claim 1 wherein said free end of said skein is inserted into said overall sleeve through a funnel comprising a transitional zone between a large opening and a small opening.

13. A process according to claim 12 wherein said funnel has a changing cross-section.

* * * * *